June 22, 1965  H. BERENS  3,190,135
INFINITELY VARIABLE CONE PULLEY TRANSMISSION
Filed July 25, 1963  3 Sheets-Sheet 1

INVENTOR.
HEINRICH BERENS
BY Bailey, Stephens & Huettig
ATTORNEYS

June 22, 1965  H. BERENS  3,190,135
INFINITELY VARIABLE CONE PULLEY TRANSMISSION
Filed July 25, 1963  3 Sheets-Sheet 2
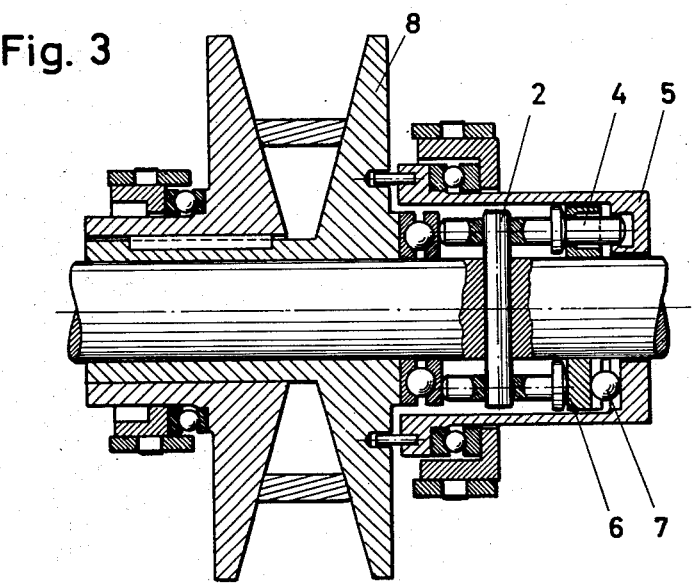
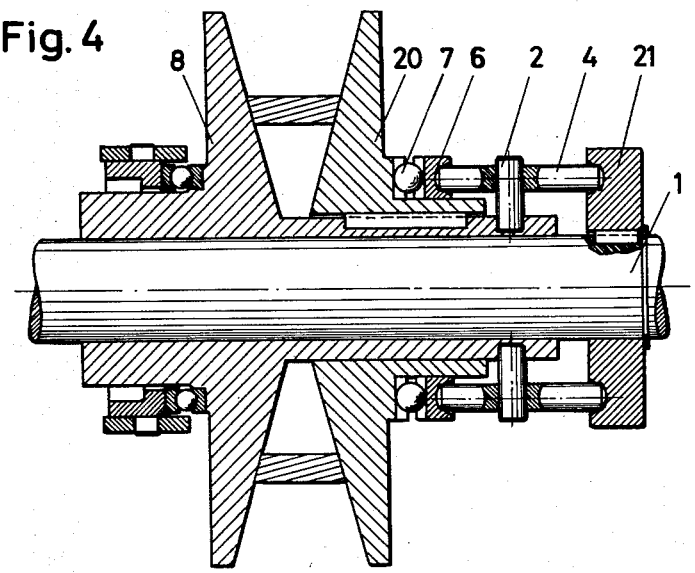
INVENTOR.
HEINRICH BERENS
BY Bailey, Stephens + Huettig
ATTORNEYS June 22, 1965  H. BERENS  3,190,135
INFINITELY VARIABLE CONE PULLEY TRANSMISSION
Filed July 25, 1963  3 Sheets-Sheet 3

INVENTOR.
HEINRICH BERENS
BY Bailey, Stephens + Huettig
ATTORNEYS

United States Patent Office 3,190,135
Patented June 22, 1965

3,190,135
INFINITELY VARIABLE CONE PULLEY TRANSMISSION
Heinrich Berens, Bad Homburg vor der Höhe, Germany, assignor to Reimers-Getriebe KG., Ascona, Switzerland, a firm of Switzerland
Filed July 25, 1963, Ser. No. 297,492
Claims priority, application Germany, July 31, 1962, R 33,240
9 Claims. (Cl. 74—230.17)

The present invention relates to an infinitely variable cone pulley transmission which is provided with conical pulley disks which are slidable in the axial direction on the transmission shafts for the purpose of varying the gear ratio of the transmission, and in which the contact pressures which are required on the drive shaft and/or the driven shaft for transmitting the frictional forces from the conical disks to the driving element are generated by a pressure-producing device on the respective shaft which by means of pressure surfaces which are inclined at fixed angles of a uniform pitch and by balls or rollers between these inclined surfaces produces axial and peripheral forces in proportion to the torque of the respective shaft.

Infinitely variable cone pulley transmissions of the above-mentioned type are already known of different designs, for example, in the form of a transmission with an endless driving element running between two pairs of conical disks on the drive and driven shafts or in the form of a transmission in which two smooth conical disks are provided, the axes of which intersect each other and which roll directly along each other. The driving element of the first-mentioned type of transmission may consist of a smooth V-belt or of a link chain with friction elements thereon, but it may also consist of a smooth ring which connects the two pairs of conical disks with each other. The driving element may further consist of a laminated, teeth-forming chain which runs between conical disks with serrated surfaces. Especially in transmissions in which two smooth conical disks roll directly along each other it is absolutely necessary to press one disk axially against the other disk so as to attain the proper amount of friction between both disks. However, it has also been found advisable in cone pulley transmissions with an endless driving element running between two pairs of conical disks to produce the necessary tension of the driving element by pressing the conical disks in the axial direction against this element. In order to attain a transmission of a high efficiency under varying load conditions and also to avoid a slipping of the driving element when the transmission is subjected to an excessive load, the strength of this axial pressure, hereafter also called the contact pressure, should be in proportion to the torque of the transmission shaft and also dependent upon the particular gear ratio to which the transmission is adjusted. Transmissions which are designed in this manner are far superior to the conventional type in which the necessary contact pressure is produced by a constant spring force which may act either upon the conical disks or upon the driving element.

In a simple pressure-producing device of a known design, the torque of the transmission shaft is transmitted by means of balls which are inserted between two inclined pressure surfaces of a fixed and constant angularity. The axial contact pressures which are generated by these pressure-producing devices bear through thrust bearings upon nonrotatable parts of the transmission so that only an axial force is produced which has a strength in proportion to the torque of the transmission shaft. The contact pressure which is generated by such a pressure-producing device is therefore independent of the gear ratio of the transmission and it is thus impossible to make this contact pressure of the exact strength which may be necessary for each different gear ratio and the corresponding position of the driving element between the conical disks.

In another pressure-producing device of a known design, the pressure surfaces between which the balls for transmitting the torque are inserted are made in the form of cam surfaces with a continuously changing pitch angle so that the axial force which is then produced is dependent not only upon the torque but also upon the gear ratio of the transmission. This construction has, however, the disadvantage that, if the direction of rotation or the direction of the torque is reversed, a backlash occurs between the pair of conical disks and the associated shaft of the transmission since at such a change the balls which are transmitting the torque must be brought into engagement with the inversely ascending cam surfaces. This backlash results in hard knocks which may damage the transmission.

In another pressure-producing device of a known type the contact pressures are derived from the torques which occur on both the driving and the driven shaft and the sum of these torques is exerted upon the conical disks. In order to attain the desired torque-responsive and gear ratio-responsive effect, this pressure-producing device has to be of a rather complicated and expensive construction. In still another known device, the angularity of the pressure surfaces is changed in accordance with the change in the gear ratio of the transmission. This requires a very complicated construction and the cost of production of this device is therefore also extremely high. Furthermore, the revolving masses of this device have to be of a considerable size.

It is an object of the present invention to provide a pressure-applying mechanism for an infinitely variable cone pulley transmission which overcomes the above-mentioned disadvantages of similar known devices and only requires very simple means for producing a contact pressure which is responsive to the torque as well as to the gear ratio of the transmission.

The present invention is intended to be applied to an infinitely variable cone pulley transmission with two pairs of conical disks, in which for changing the gear ratio of the transmission the disks of each pair are slidable in the axial direction relative to each other along the respective shaft, and in which the contact pressures which are required for transmitting the frictional forces are produced on the drive shaft and/or on the driven shaft by means of a pressure-producing device on the respective shaft which is provided with inclined pressure surfaces of a fixed and constant angularity and with balls or rollers between these surfaces in order to produce axial and peripheral forces which are in proportion to the torque of the respective shaft. In a transmission of this type, the above-mentioned object is attained by changing the torque-responsive axial forces in proportion to a change in the gear ratio of the transmission by dividing the peripheral force which is produced by the torque of the shaft into two peripheral force components, one of which is transmitted directly upon the axially slidable conical disk, while the other component is transmitted thereto through the pressure-producing device. This division of the peripheral force is carried out by means of at least one "rocking pin" which is pivotably mounted between two bearings and by means of at least one pressure pin which engages upon the rocking pin at a point, the distance of which from the opposite bearings is variable in accordance with the axial displacement of one of the conical disks due to the change in the gear ratio of the transmission.

The pressure-applying mechanism according to the invention, is therefore designed so as to divide the peripheral force which is produced by the respective shaft or of the conical disks thereon, respectively, into two components, one of which is transmitted directly to one of the conical disks, while the other component is transmitted to the same conical disk through a pressure-producing device of a known type. The mechanism according to the invention is further designed so that the maximum axial contact pressure will be produced when the gear is adjusted to such a gear ratio that the driving element, i.e. the endless belt, chain, or the like, which runs between the conical disks on one transmission shaft has its smallest possible diameter or, in the case of a transmission in which the conical disks roll directly along each other, when one of these disks runs along the smallest possible radius of the other disk. In this manner, the object of the invention is fully attained to produce a pressure-applying mechanism which is responsive to the torque as well as to the gear ratio of the transmission and is absolutely reliable in operation, has a small size, light weight, and sturdy construction, requires the simplest possible means consisting only of a small number of parts, may be built at a low cost, and may be employed for axially slidable conical disks either on the drive shaft or the driven shaft or on both shafts.

Another feature of the invention which has proved to be of advantage consists in providing one of the bearings of the rocking pin on a part which is rigidly secured to the pressure-producing device and the other bearing in a part which is rigidly secured to the axially slidable conical disk, and to secure the pressure pin rigidly to the respective shaft of the transmission. If the mechanism according to the invention is designed in this manner, the torque, for example, of the shaft is transmitted by the pressure pin on the shaft to the rocking pin. This transmitted peripheral force is then divided into two variable components one of which is transmitted directly to the axially movable conical disk, while the other component is transmitted to this disk through the pressure-producing device. The sizes of these components depends upon the particular gear ratio to which the transmission is adjusted, i.e. upon the extent of the axial displacement of the conical disk. The size of each of these components relative to the size of the other depends upon the location of the point of engagement of the pressure pin on the rocking pin. If, for example, the pressure pin engages upon the rocking pin at a point near the pressure-producing device when the driving element running between the pair of conical disks on the respective shaft has its smallest possible diameter the largest possible axial contact pressure upon this disk and thus upon the driving element will be attained. In the opposite case, that is, when the pressure pin engages upon the rocking pin at a point near the part which is rigidly secured to the axially slidable conical disk, the minimum contact pressure will be attained. The maximum and minimum values of the axial pressure may be structurally determined and varied by making the cam surfaces of the pressure-producing device of any desired angularity and also by mounting the rocking pins at different distances from the shaft axis, whereas the distribution of the peripheral force as a function of the displacement of the pressure pin relative to the rocking pins may be carried out at any desired ratio by making the pins of a suitable shape. Thus, for example, for special purposes, the rocking pin or pins may be curved in their longitudinal direction. The torque of the transmission shaft will then be transformed into a peripheral force which changes in relation to the radial distance of the point of engagement of the two pins from the axis of the shaft.

The device according to the invention may also be designed in such a manner that the rocking pin may be mounted at one end in a part which is rigidly secured to the shaft and at the other end in a part which is rigidly secured to the pressure-producing device which cooperates with the fixed conical disk, that is, the disk which is not slidable axially for changing the gear ratio, while the pressure pin is rigidly secured to the axially slidable conical disk. The effect which will be attained by this arrangement is the same as that of the embodiments which were previously described, namely, that the required axial contact pressure depends upon the torque as well as upon the gear ratio of the transmission.

Another feature of the invention consists in providing at least one pair of rocking pins parallel to each other and to mount the pressure pin so as to extend radially to the transmission shaft and so that its free end lies between the two rocking pins of one pair. The pressure pin may then engage upon the rocking pins between the bearings thereof or engage outside of the bearings of each pair of rocking pins on an extension of each rocking pin which projects through and beyond one of the bearings. Since the rocking pins engage upon both sides of the pressure pin any knocking in the transmission will be absolutely prevented when its direction of rotation or direction of torque is reversed.

In order to facilitate the adjustment and to attain a large contact surface between the pressure pin and the rocking pins it has been found advisable to provide the ends of the presure pin with rollers which engage with the rocking pins and each of which has a peripheral groove therein of a cross-sectional shape substantially equal to that of the rocking pins.

A further modification of the invention may consist in providing several radially extending rocking pins which are distributed at equal distances peripherally from each other, and in further providing a corresponding number of pairs of pressure pins which are inclined at an oblique angle to the axis of the transmission shaft and each pair of which embraces one of the rocking pins. This embodiment of the invention has the further advantage that it permits the contact pressure to be exerted in any desired proportion to the gear ratio by making the pressure pins which lie within radial planes passing through the axis of the shaft of a suitable curved shape.

The features and advantages of the present invention will become more clearly apparent from the following detailed description thereof which is to be read with reference to the accompanying drawings, in which—

FIGURE 3 shows a longitudinal section of another modification of the invention, in which the pressure pin engages upon the rocking pins outside of the bearings of the latter;

Figure 5:
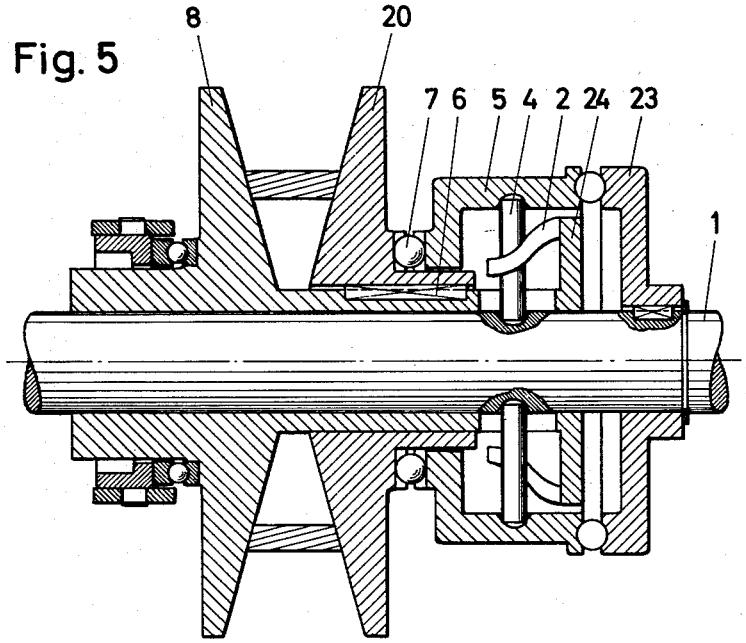

FIGURE 4 shows a longitudinal section of a further modification of the invention, in which only one of the conical pulley disks is slidable in the axial direction for changing the gear ratio and the pressure pins extend radially to the shaft; while FIGURE 5 shows a longitudinal section of still another modification of the invention, in which two pairs of pressure pins are inclined as well as curved relative to the shaft.

Figure 1:
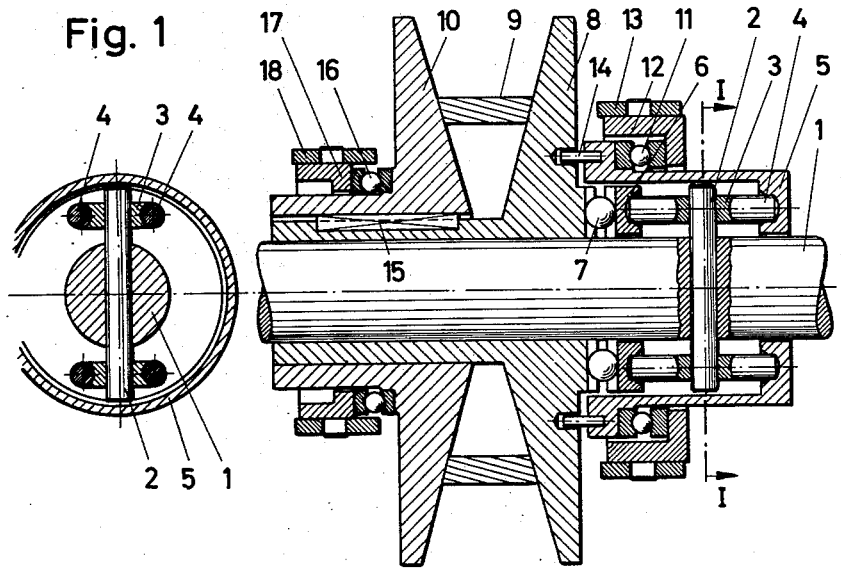
FIGURE 1 shows at the right side a longitudinal section of a first embodiment of the invention, in which the pressure pin extends in a radial direction to the shaft, while at the left side it shows a cross section which is taken along the line I—I of the first drawing.

As illustrated in the two sectional drawings shown in FIGURE 1, the shaft 1 of the transmission carries a pressure pin 2 on the ends of which pulleylike rollers 3 are rotatably mounted, each of which engages upon a pair of rocking pins 4 which extend parallel to the axis of shaft 1 and are mounted diametrically opposite to each other at one end in a pressure sleeve 5 and at the other end in a pressure-producing cam ring 6 with inclined surfaces of a constant angularity which is operatively associated with corresponding inclined surfaces on a conical pulley disk 8 and with balls 7 which are interposed between the inclined surfaces on the parts 6 and 8. Between this conical disk 8 and the opposite conical disk 10 runs the endless driving element 9, for example, a chain. The peripheral force which is derived from the torque of shaft 1 is transmitted through the rocking pins 4 and the pressure sleeve 5 to the conical disk 8 by connecting means 14 which are axially slidable but nonrotatable relative to disk 8. Pressure sleeve 5 acts through a ball bearing 11 upon a thrust ring 12 which may be shifted in the axial direction by means of a control lever 13. The other conical disk 10 is supported in a similar manner by a ball bearing 16 on a thrust ring 17 which may likewise be shifted in the axial direction by a control lever 18. A key 15 connects the two conical disks 8 and 10 nonrotatably to each other and permits them to slide in the axial direction relative to each other.

By means of the pressure pin 2 which is rigidly secured to shift 1 and the rollers 3 on the ends of pin 2, the torque of shaft 1 is transformed into peripheral forces on the rocking pins 4 and which are transmitted by the ends of pins 4 to the cam ring 6 and its inclined pressure-producing surfaces and to the pressure sleeve 5. Pins 4 are pivotably mounted at their outer ends in bearing recesses in pressure sleeve 5 and cam ring 6 so as to be able to carry out slight rocking movements. The torque of shaft 1 is thus divided into two force components which are transmitted in two directions. One force component is transmitted by the rocking pins 4 to pressure sleeve 5 and through the latter and the connecting means 14 to the conical disk 8 and then through the key 15 also to the other conical disk 10, while the other force component is transmitted to the conical disk 8 through the pressure-producing device which consists of the cam ring 6 with its inclined surfaces, the corresponding inclined surfaces on disk 8, and the balls 7 between these surfaces. Due to the action of this pressure-producing device 6, 7 an axial force is also exerted at the same time on disk 8 which is freely rotatable and slidable on shaft 1, and which is thereby pressed against the chain 9 to produce the necessary tension thereof. While the axial force which is thus also exerted on disk 10 is taken up in a known manner by ball bearing 16, thrust ring 17, and control lever 18, the force of reaction which is produced in cam ring 6 is taken up by the rocking pins 4, pressure sleeve 5, ball bearing 11, thrust ring 12, and control lever 13. When the conical disk 8 is shifted in the axial direction when the gear ratio of the transmission is being changed, the position of pressure pin 2 and rollers 3 therein is also changed relative to rocking pins 4 so that a different distribution of the torque of shaft 1 occurs. The axial force which is produced by the pressure-producing device 6, 7 is thus also changed in accordance with the change in the gear ratio of the transmission.

Figure 2:
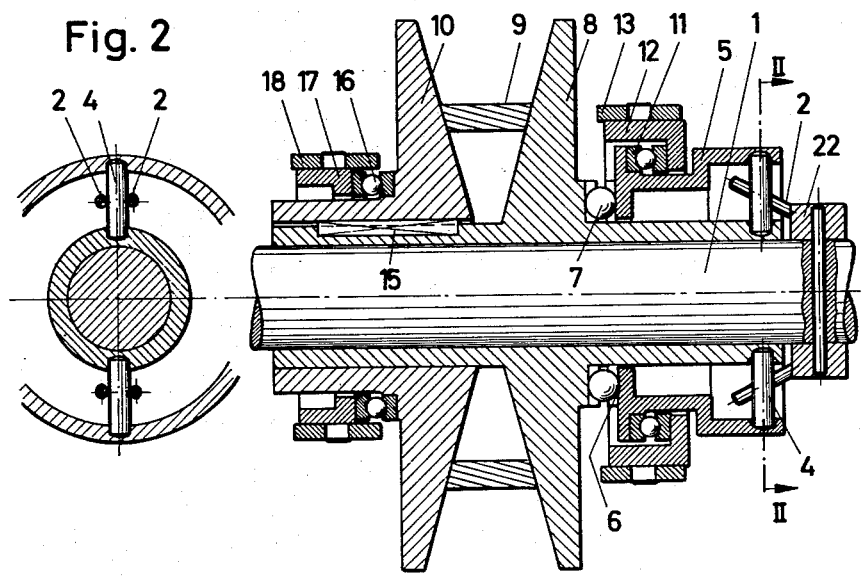
FIGURE 2 shows at the right side a longitudinal section of a modification of the invention, in which two pairs of pressure pins are secured to the shaft so as to extend at an oblique angle to the axis of the shaft, while at the left side it shows a cross section which is taken along the line II—II of the drawing at the right side.

According to the modification of the invention as illustrated in the two sectional drawings shown in FIGURE 2, the rocking pins 4 are again mounted between the conical pulley disk 8 and the pressure sleeve 5, but in a manner so as to extend radially to shaft 1, rather than parallel as shown in FIGURE 1 and near the outer end of sleeve 5. On its other end, pressure sleeve 5 carries the cam ring 6 of the pressure-producing device. Pressure pins 2 which act upon rocking pins 4 are mounted in pairs in a flange or ring which is rigidly secured to shaft 1, and they are inclined at an oblique angle to the axis of shaft 1. When the gear ratio of the transmission is being changed, the distance between shaft 1 and the points of engagement of pressure pins 2 on the rocking pins 4 also changes which, in turn, means that the distribution of the torque of the shaft is likewise changed and a lower or higher axial pressure is then exerted upon the conical disk 8 in accordance with the new gear ratio.

FIGURE 3 illustrates a further modification of the invention, in which the pressure-producing device 6, 7 is again provided within pressure sleeve 5, but acts upon the outer end of this sleeve. Rocking pins 4 are in this case pivotably mounted in a pair of bearings, near the outer ends of pins 4, namely, in bearing recesses in the end wall of pressure sleeve 5 and in bearing apertures in the cam ring 6 through which pins 4 project toward and rest upon a ball bearing on the conical disk 8. Pressure pin 2 which is secured to shaft 1 acts again through rollers upon the extensions of rocking pins 4. When the gear ratio of the transmission is being changed, the points of engagement of pressure pin 2 on rocking pins 4 will also be changed along the latter, whereby the axial force which is produced by the pressure-producing device 6, 7 will also be changed. The force of reaction which corresponds to this axial force then acts through flanges on rocking pins 4 upon the conical disk which thereby exerts the necessary contact pressure upon the chain.

FIGURE 4 illustrates the mechanism according to the invention as being applied to a cone pulley transmission in which only one conical disk of the pair of disks is shifted in the axial direction when the gear ratio of the transmission is being changed. A ring 21 which supports the rocking pins 4 at one end is rigidly secured to shaft 1, while the other end of pins 4 engages upon the cam ring 6 which together with the balls 7 and the inclined surfaces on the conical disk 20 forms the pressure-producing device. In this embodiment of the invention the pressure pins 2 are firmly secured to the slidable conical disk 8 and therefore, when the gear ratio is being changed and disk 8 is shifted in the axial direction the points of engagement of pressure pins 2 on rocking pins 4 will also change along the latter so that the axial pressure upon disk 20 will likewise change in accordance with the new transmission ratio.

FIGURE 5 illustrates another pressure-applying mechanism according to the invention for a cone pulley gear which is likewise adjustable only at one side. In this mechanism, the pressure pins 2 are again provided in pairs and mounted on a flange 24 which is rigidly secured to the axially slidable conical disk 8. Pressure pins 2 act upon the rocking pins 4 which project radially from shaft 1 and connect the same to the pressure sleeve 5. The axial force which is produced in this manner by the pressure-producing device 6, 7 is braced at one side through a ball bearing on a flange 23 which is rigidly secured to shaft 1 and it is exerted at the other side upon the conical disk 20 to shift the same in the axial direction so as to tighten the chain. The pressure pins 2 in the embodiment according to FIGURE 5 are curved within the radial planes which extend through the axis of gear shaft 1 so that the axial force which is exerted upon the conical disk 20 in response to a change in the gear ratio of the transmission will be varied in a manner as may be desired for special purposes.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An infinitely variable cone pulley transmission having a pair of shafts, a pair of conical disks on each shaft, an endless driving element connecting the two pairs of disks, means for sliding at least one of said disk on each shaft relative to the other disk on said shaft in a direction opposite to the relative sliding movement of the disks on the other shaft for changing the gear ratio of said transmission, pressure-producing means on at least one of said shafts for applying said disks on said shaft against said driving element with a contact pressure varying with said gear ratio and with the torque of said shaft, said pressure-producing means comprising cam members having inclined surfaces of a fixed and constant angularity and rolling bodies between said inclined surfaces, and means for dividing the peripheral force produced by the torque of said shaft into two variable components, one of said components acting directly upon the conical disk which is axially slidable for changing said gear ratio and the other component acting upon said slidable disk through said pressure-producing means, said force dividing means comprising at least one rocking pin, bearing means for rockably mounting said pin, and at least one pressure pin engaging upon said rocking pin at a point the distance of which from said bearing means is variable in accordance with the axial movements of said slidable disk whereby one of said components of the peripheral force is transmitted directly to said slidable disk, while the other component is transmitted to said pressure-producing means, so that the axial pressure produced by said pressure-producing means depends upon the actual position of said pressure pin on said rocking pin resulting from said gear ratio.

2. An infinitely variable cone pulley transmission as defined in claim 1, in which said bearing means comprise a pair of bearing members for supporting the opposite ends of said rocking pin, one of said bearing members being rigidly secured to a part of said pressure-producing means and the other bearing member being rigidly secured to said shaft.

3. An infinitely variable cone pulley transmission as defined in claim 1, in which for varying the gear ratio of said transmission one of said conical disks on at least one of said shafts is axially slidable and the other disk is nonslidable along said shaft, said bearing means comprising a pair of bearing members for suporting the opposite ends of said rocking pin, one of said bearing members being rigidly secured to said shaft and the other bearing member rigidly secured to a part of said pressure-producing means operatively associated with said axially non-slidable disk for pressing the same against said driving element.

4. An infinitely variable cone pulley transmission as defined in claim 1, in which said pressure pin is extending in the radial direction to said shaft and is associated with a pair of said rocking pins extending parallel to each other and embracing the free end of said pressure pin.

5. An infinitely variable cone pulley transmission as defined in claim 4, in which said bearing means comprise a pair of bearing members for supporting the opposite ends of each of said rocking pins, said pressure pin engaging upon said rocking pins between said bearing members.

6. An infinitely variable cone pulley transmission as defined in claim 4, in which said bearing means comprise a pair of bearing members for supporting said rocking pin near one end thereof, the other end of said rocking pin projecting through and beyond one of said bearing members, said pressure pin engaging upon said other end of said rocking pin.

7. An infinitely variable cone pulley transmission as defined in claim 1, further comprising a roller rotatably mounted on each end of said pressure pin having a peripheral outer surface substantially corresponding to the cross-sectional shape of said rocking pins and each of said rollers engaging with at least one of said rocking pins.

8. An infinitely variable cone pulley transmission as defined in claim 1, in which a plurality of said rocking pins extend radially to said shaft and at equal peripheral distances from each other, said pressure pins forming pairs and each pair embracing one of said rocking pins and extending at an oblique angle to said rocking pin.

9. An infinitely variable cone pulley transmission as defined in claim 8, in which said rocking pins of each pair are curved within radial planes intersecting the axis of said shaft.

References Cited by the Examiner

UNITED STATES PATENTS 2,651,208   9/53   Karig _____ 74—230.17

FOREIGN PATENTS 1,206,797   8/59   France.

DON A. WAITE, *Primary Examiner.*